Aug. 29, 1961  G. O. CONNER  2,997,902
DRILL BUSHING AND METHOD OF MAKING SAME
Filed March 31, 1960  2 Sheets-Sheet 2
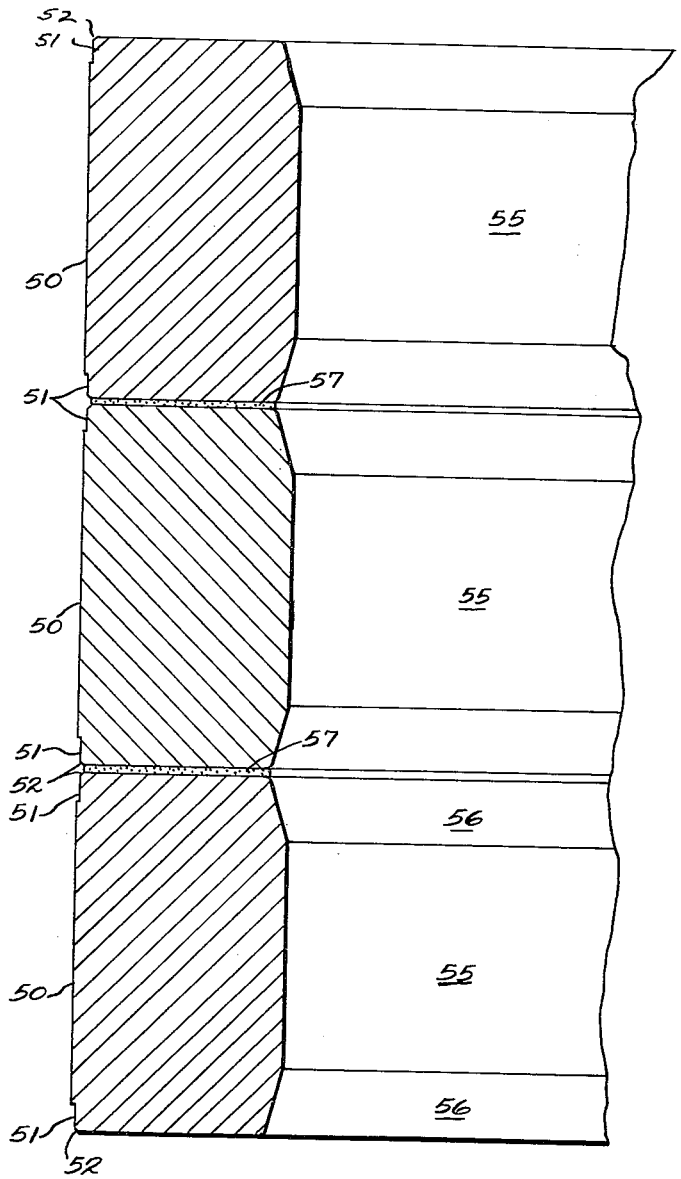
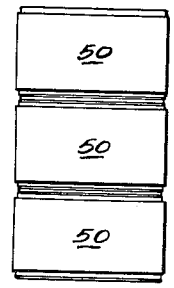
Fig.19
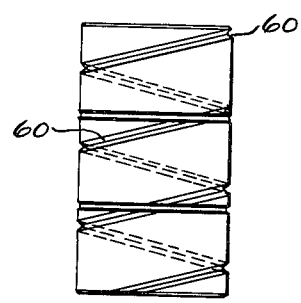
Fig.21
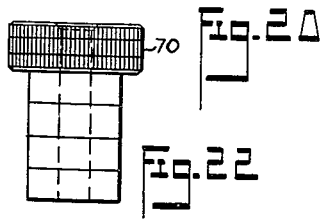
Fig.20  Fig.22
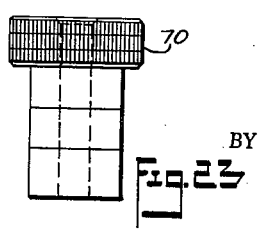
Fig.23
INVENTOR.
GUY O. CONNER
BY J. O. Douglass
HIS ATTORNEY United States Patent Office 2,997,902
Patented Aug. 29, 1961

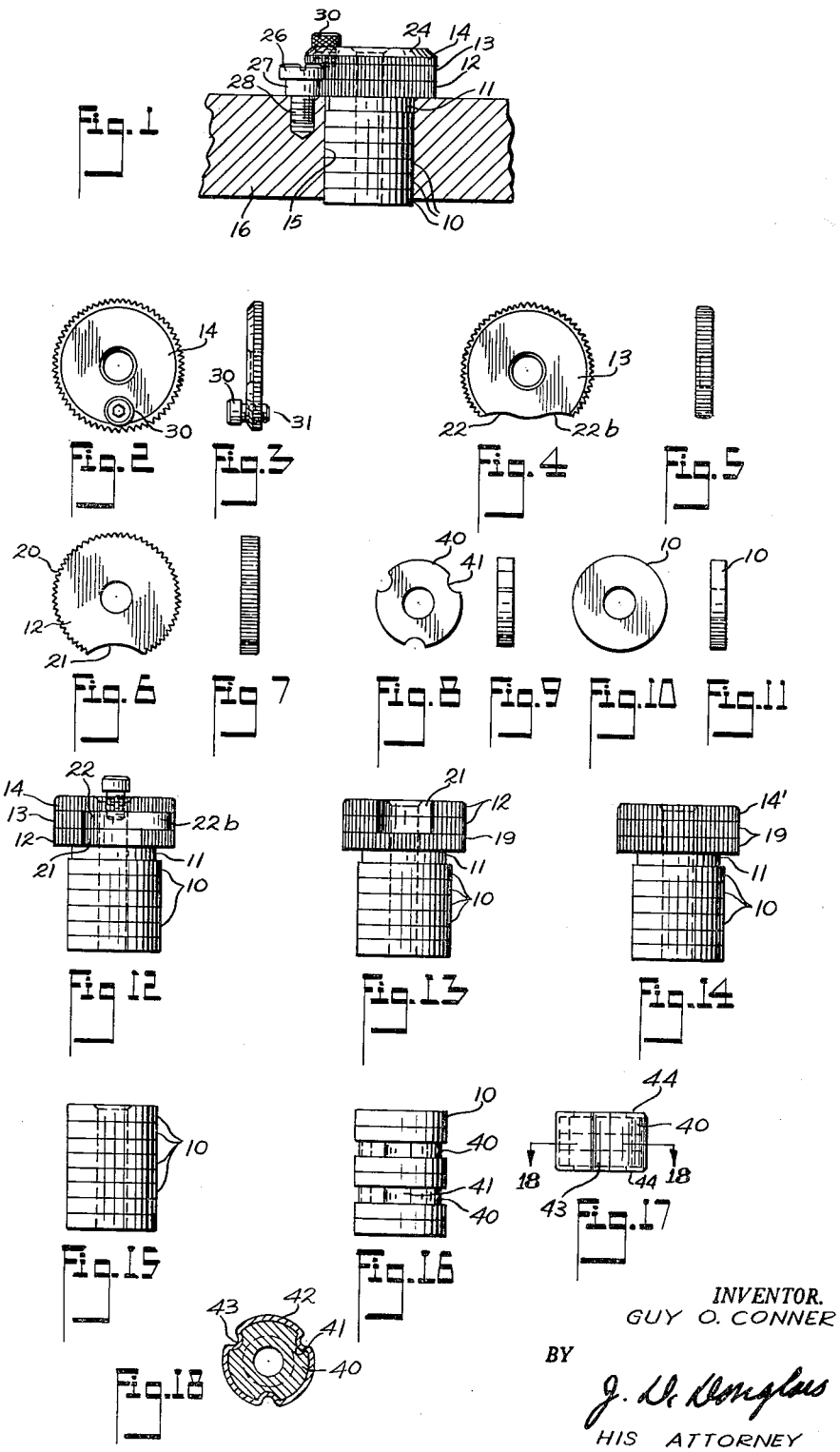

2,997,902
DRILL BUSHING AND METHOD OF MAKING SAME
Guy O. Conner, 1118 Mount Vernon Blvd., Cleveland Heights, Ohio
Filed Mar. 31, 1960, Ser. No. 19,114
23 Claims. (Cl. 77—62)

This invention relates to drill guide bushings and more particularly to an improved construction of a drill guide bushing and the method of making the same. It is a continuation-in-part of my application Serial No. 523,742, filed July 22, 1955, now abandoned.

As is well known to those versed in the art, it is common practice to provide a drill guide bushing which usually comprises a hollow stem adapted to be engaged in an opening in a jig, the bore in the stem being of a size to provide a guide for the drill. The bushing holds and guides the drill in a predetermined position during drilling operations. The stems may have heads thereon which engage the top of the jig to prevent the stem from sliding through the jig and these heads may be provided with suitable contoured peripheries to engage with locking means that is provided on the jig. Drill bushings of the above types are frequently classified according to the manner in which they are fastened to the jig as being "fixed renewable heads," "slip renewable heads" or "press fit heads" and "headless."

In order to serve their purpose it is essential that the bore of the drill bushing be of the exact size to receive a certain specific drill. Therefore it becomes apparent that since there are a great number of different drill sizes, a correspondingly large number of sizes of drill bushings must be stocked in order to meet the demand. In addition the stock is multiplied because of the fact that the same size bushings may have different types of heads or no heads, such as previously described, and that therefore, for each size of drill, a number of different types must be stocked.

It should be pointed out that the above defined types of heads are the more common types and, since it frequently happens that heads of special types are desired, that the stock of drill bushings which has to be carried, and, is necessary for supplying the consumer, is very large.

Furthermore, the manufacture of these drill bushings is relatively expensive, because, due to the close tolerances that must be held, they are commonly formed on screw machines from solid stock. The manufacture of the larger sizes in particular, results in an enormous waste of expensive material which must be machined away to provide the desired formation with a resultant increase in cost.

From the foregoing it can be seen that the manufacturer or distributor must carry an extremely large and expensive stock in order to be able to anticipate the demands for certain sizes and types and to at all times be able to supply the demand of his customers.

By the present invention it is possible to provide drill bushings which are much more economical to manufacture and wherein the distributor or manufacturer, with a minimum of equipment, can meet the demands for different sizes and types without a great loss of time due to manufacturing operations.

Furthermore it is possible, because of the new construction, to greatly reduce the cost of the drill bushings, which have drill engaging surfaces that are harder than the drill for the purpose of increasing the bushing life.

In the drawings I have illustrated a number of modifications of the invention. It will be apparent that still other modifications coming within the scope of my disclosure will be suggested by the drawings and the description which is made for the purpose of illustration and not necessarily that of limitation.

In the drawings:
FIG. 1 is an elevational view of a slip renewable drill bushing in position in a portion of a drill jig;
FIG. 2 is a top plan view of the top of the head;
FIG. 3 is a side view of the head which is disassembled;
FIGS. 4 and 5 are similar views of a second portion of the head immediately below the top of the head shown in FIG. 1;
FIGS. 6 and 7 are similar views of the bottom portion of the head as shown in FIG. 1;
FIGS. 8 and 9 are plan views and side views respectively of a form of disc used for the stem;
FIGS. 10 and 11 are similar views of other discs used to form the stem;
FIG. 12 is a view of the slip renewable bushing of FIG. 1 removed from the jig and taken at 90° to that of FIG. 1;
FIG. 13 is a view similar to FIG. 12 of a fixed renewable bushing;
FIG. 14 is a view of a head press fit bushing;
FIG. 15 is a view of a headless bushing formed of the discs of FIGS. 10 and 11;
FIG. 16 is a view of a headless bushing formed of the discs of FIGS. 8 to 11 inclusive;
FIG. 17 is a view of a modification of a bushing made from the discs of FIGS. 8 and 9;
FIG. 18 is a section on the line 18—18 of FIG. 17, looking in the direction of the arrow;
FIG. 19 is an elevational view of another embodiment of my invention;
FIG. 20 is an enlarged fragmentary section of the bushing of FIG. 19;
FIG. 21 is an elevational view of another embodiment;
FIG. 22 is an elevational view of another embodiment;
FIG. 23 is an elevational view of another embodiment.

Briefly, my invention comprises the provision of a plurality of discs or sections which are apertured and are adapted to be superimposed upon each other to form a composite bushing. By making the bushing of discs or sections, a great economy or savings in metal is realized, because the discs or sections may be stamped out of metal and assembled to provide the desired form of bushing. The fact that they may be stamped out of metal, leaves edge surfaces which may be hardened with very little loss of metal.

The invention also contemplates that the bushings may be made up of laminations which may be secured together in such a manner that portions of the stem may be severed therefrom to provide a bushing of different length from stock bushings. In this respect it is also contemplated that in some instances, the sections which are used to make up a stock bushing may also be of different length.

Although the invention will be described as being useful particularly in connection with the manufacture of drill bushings, it will be apparent that it is also useful for other purposes. Furthermore bushings of the desired length can be made up from short sections or a bushing made from two or more sections which may be subsequently sheared to provide a shorter bushing when the occasion arises. This enables a dealer or user to stock a few bushings of a certain length and then sever portions from the stems of the bushings to provide bushings of a shorter length, thus resulting in a material reduction in the stock necessarily carried.

As illustrated in the embodiment of FIG. 1, the stem is formed of six discs 10, as shown in FIGS. 10 and 11, which are superimposed upon each other. A top disc 11, which may be slightly smaller than the disc 10 is provided and a head, comprised of the discs 12, 13 and 14 superimposed upon each other. The discs are shown in detail in FIGS. 5, 4 and 2 respectively.

The discs are all provided with central aperatures which are substantially the same size, the size depending upon the size of the drill to be guided. The periphery of the discs 10 are also substantially the same size and the size also depends upon the size of the opening 15 in the jig 16 into which the bushing is to be placed. The disc 11, being smaller than the other, assures that the assembly will seat without interference in the jig 16.

In the particular bushing shown in FIG. 1 the lower head disc 12 has a corrugated periphery 20 and is provided with a semi-circular notch 21 on the side as best shown in FIG. 6. It will be appreciated that the manner of the corrugation may be varied and diamond point knurls or any other suitable formation provided on the periphery as may be desired. Superimposed upon the disc 12, is the second disc 13 which is provided with an elongated double curved notch 22, the left side of which has the same radius as the notch 21 on the disc 12 and is adapted to be in alignment with the notch of 21, while the right side, 22b, overlies the disc 12 to the right of the notch 21, as is more clearly shown in FIG. 12. The top disc may be a plain disc without any notches but, as shown in FIGS. 2 and 3, is provided with a beveled edge 24 largely for the purpose of appearance.

It will be seen that when the head portions are assembled in the manner shown in FIGS. 12 and 1 that the aligned notches 21 and 22 in the lower discs provide a recess which is sufficiently enlarged to allow it to pass behind the head 26 of a screw 27 which is threaded in a bore 28 adjacent to the drill guide opening. When the bushing is rotated clockwise the head 26 passes into the recess 22b. This structure is well known in the art and is what is known as a "slip renewable bushing." This type of bushing may be slipped into the bore or socket of the jig and then rotated clockwise to cause the head 26 to go into the right side of the notch or recess in the head 13 at which time it overlies the material of the lower disc and is held in place. This structure is also sometimes known as a "bayonet lock."

In this particular instance I have shown an additional feature in that when the drill bushing is slipped in place, a screw 30, which is threaded through the top disc and positioned over the notch 22 in the disc 13, may be screwed downward, at which time the stem 31 is alongside the head 26. This being effected after the bushing is in place, it blocks the removal of the bushing accidentally, since it cannot be rotated to bring the head of the screw out of the recess 22b. Thus the bushing cannot be accidentally removed, as sometimes happens when the drill is pulled out of the work, and frequently resulting in breaking the drill.

The laminated structure, the parts of which may be made of the various discs, all of which are stamped out of metal, eliminates the costly operation of profile milling of the head, and any type of head construction may be provided at substantially no difference in cost. The discs therefore may be made without any milling operation and the assembly carried out by extremely low cost unskilled labor.

The discs forming the stem and head may be secured to each other in various ways. They may be projection welded, sweat soldered, brazed or cemented to each other. Brazing is a desirable method in that the brass, copper or bronze in the form of very thin discs are interposed between the other discs and the assembly heated to fuse the opposing surfaces together and hold them securely in the assembled position. This operation may be performed simultaneously with the heat treating operation desirable in this type of device.

FIG. 13 illustrates a bushing known as a "fixed renewable." It is comprised of a plurality of discs 10, which are the same as in FIG. 13, along with the disc 11 at the top. The head in this instance comprises a disc 19, secured on the disc 11, which is circular with the usual corrugated periphery. It is surmounted by two of the discs 12 having their notches 21 in alignment. This type of bushing is placed in the jig by removing the screw 26 after which the screw may be placed in position and enters into the notch 21 with the head of the screw engaging the top of the disc 10.

FIG. 14 illustrates a type of drill bushing known as the "head press fit." The stem is comprised of a plurality of discs 10 surmounted by the smaller disc 11 and the head composed of two of the discs 19 and a disc 14' similar to the disc 14 except that it does not have the threaded hole for the screw 30, since the screw is not needed.

FIG. 15 illustrates a "headless press fit" bushing and is comprised simply of a plurality of the discs 10 superimposed upon each other and soldered, welded, brazed or cemented together.

FIGS. 8 and 9 illustrate a type of stem disc 40 which is provided with notches 41 that may be equally spaced about its periphery.

As shown in FIG. 16 there is provided a bushing made according to my invention particularly adapted for imbedment in castable materials. In this instance a plurality of the discs 10 are provided and interposed between discs 10 and pairs of discs 40 which are slightly smaller and are provided with peripheral notches 41. The notched discs are spaced third from the top and third from the bottom, and, when cast in the material, the material flows into grooves left by the notched discs and into the notches, holding the bushing securely in place.

This type of disc shown in FIG. 8 is particularly useful in the embodiment of my invention shown in FIGS. 17 and 18. In this instance several of the discs may be superimposed upon each other and enclosed in a metallic casing 42, the periphery of which is provided with inwardly pressed ribs 43 that engage in the notches. It is contemplated that the casing be slightly longer than the assembled discs in order that the ends may be spun over at 44 at the top and bottom to provide a housing for holding the discs in superimposed relation. It will be apparent that in a structure of this character the diameter of the discs will be smaller by twice the thickness of the casing and that the diameter of the casing will be that of the opening in the drill jig in which the device is to be placed. The device shown in FIG. 17 is the "headless press fit" type.

Any one or more of the discs 10 may be made of a material harder than the drill, of which there are many on the market including silicon carbide, tungsten carbide and aluminum oxide and some of the tantalum alloys. These discs may be placed at any point in the stem such as the top and the bottom or spaced by one or more discs from the top and bottom. Thus a highly wear resistant bushing can be provided, at a relatively low cost.

Since the hard discs can be made slightly smaller than the other discs, the final operation of grinding the size is considerably cheaper because only the softer discs need to be ground on their peripheries.

It will be apparent that the discs may be made in many ways, a preferred way being that of stamping in a combination die. By this method the disc may be stamped accurately and fast and very close to the finished size. Preferably the stem discs should be slightly oversized on the exterior and with the hole somewhat smaller than the finished hole in order that they may be finished ground to exact tolerances after assembly.

It will be apparent that with a relatively small variety of pieces being stocked, it is possible by my invention, to make a large variety of bushings. This decreases the large inventory of finished material that has otherwise been necessary previously.

As an example, the head parts shown in FIGS. 2, 4 and 6 may be assembled in many different ways to provide any of the wide variety of locking means including both right and left hand locking heads. It is only necessary for the manufacturer to carry in stock certain sizes of discs or washers and from these he can make any desired size or length of bushing.

Since the discs are stamped there is a great saving in material as well as labor. For instance, the material stamped from the disc centers of the larger size of bushing can be used to make smaller size bushings. With the parts shown in FIGS. 2 to 11 inclusive and with these parts having various size center holes substantially any standard form or size of bushing can be made.

It is also contemplated that the discs 10 may vary in thickness and that in some instances a single disc or section may form the stem or body. Of course the length of the stems may be varied easily by simply adding more or less discs to the head.

The structures described are particularly useful when the stem parts are secured together by one of the well known cements available today. In this instance if a bushing with a one inch stem is provided, made of a plurality of ⅛" sections, the sections could be sheared from the stem to provide a bushing which could be shortened in ⅛" increments.

It should also be understood in connection with the bushing of FIG. 16, that the bushing may be disposed in castable material that requires either hot or cold casting. This also includes plastics and compositions other than metal.

As previously stated, I also contemplate the manufacture of bushings made up of elements or sections which may be cemented together to provide certain standard length bushings and which, when a shorter bushing is desired, may be separated to provide one or more bushings of the desired length. It is also apparent that when the sections are longer they may be made by other means than stamping, such as by using stock of approximately the correct size and finishing the same in a screw machine. The above is more particularly illustrated in FIGS. 19 to 23 inclusive.

FIGS. 19 and 20 show a headless bushing made up of sections of equal length. Each section comprises a body having a cylindrical outer surface 50 throughout most of its length. Adjacent the ends the sections are provided with a short portion 51 of reduced diameter, and the extremities are beveled, as at 52.

The bore of each section is provided with a cylindrical wall 55 which extends throughout most its length but is bounded at its upper and lower edges by outwardly flaring walls 56.

The sections are held together by a suitable cement 57, of which there are a number on the market today including the so-called epoxy resins, and which when set provide nearly as good a bond as brazing or welding.

The above construction provides several advantages. There is the advantage that the bushing may be made up in short sections, which enable it to be made cheaper, it being cheaper to machine a short length than a long one. The length of these sections may vary, this being a matter of choice. For instance, they could be made of ⅛" sections after the manner of the embodiments shown in FIGS. 1 to 18 inclusive. They could also be made in ¼", ⅜" or ½" sections. Furthermore certain combinations could be made such as by combining sections of ⅛", ¼" and ⅜" or longer.

It will be noted that each section of the bushing shown in FIG. 20 is provided with a beveled surface, which may be a 15 degree angle, so that it may be severed from the other parts and still provides an entrance guiding surface for the drill, which prevents knocking off the points of the drill. These beveled portions also provide another function in that they provide a pocket for holding a lubricant which does not have to be formed after the bushing is assembled, thus providing continuous lubrication for the guided drill surfaces. In addition to the foregoing the separate surfaces 55 provide a better guiding surface for the drill than a plain cylindrical surface.

A third feature is the portion 51 of reduced diameter. This provides a good starting surface for the bushing in a fixture when it is to be used as a "press fit" bushing. It also permits the bushing to be pressed into the fixture with a tighter fit than a bushing with a plain cylindrical surface throughout its length, and helps to prevent galling during assembly. In addition, it provides a lock for bushings that are placed in position in a casting.

The small bevels 52 on the ends also provide a positioning means whereby the parting line between two of the sections may be easily located and at which a tool may be applied to sever the sections when desired.

The bushings may be severed in several ways. They can be severed by a guillotine-like cutting blade, the portions to be severed being placed in a suitable recess and the blade sliding across the face of the holder and engaging with the bushing at the parting line indicated by the bevels 52. Other means and apparatus for separating the parts will be apparent to those versed in the art.

If desired, the bushing may also be provided with a helical groove 60, as shown in FIG. 21. This also assists in installing the bushing in a jig or fixture since it eliminates galling, the same as the grooves 51. The groove may be made continuously throughout the length, or the sections may be independently grooved. It is not essential that the ends of the groove be aligned with each other, as shown in FIG. 21, and in many instances, when the grooves are made in the sections separately, and subsequently assembled, they would not be aligned.

FIGS. 22 and 23 show the structure when applied to the head type of bushing. The heads 70 could be made of independent laminations after the manner previously described. They could also be made in one piece if desired. FIG. 22 illustrated a bushing where the stem is made of four ¼ inch sections to provide a one inch long bushing. With this type of bushing the dealer would only need to stock a 1 inch long bushing and if he had an order for a ¾", ½" or ¼" bushing he would remove 1, 2 or 3 sections. The sections removed would not be wasted because they could then be sold for ¼, ½ or ¾ inch headless bushings or, the parts reassembled with other parts to provide another bushing.

FIG. 23 illustrates a bushing where the parts comprise a ⅜ section and two 5⁄16 sections and is merely illustrative of how different length sections may be assembled to provide a bushing. It is contemplated that a manufacturer or user would ordinarily use more of one type or another and this illustrates how a bushing could be made up of sections such that he would only have to stock one of a kind but could separate it when needed to make others when desired.

It will be seen that I have provided a bushing which is enormously cheaper to manufacture than the bushings of the prior art. The savings are even more increased when head type bushings are being used. Thus, there is not only an economy of manufacture, due solely to the improved construction but there is a greater versatility in that one bushing may be used to replace as many as four or more in the user's stock. In addition to the foregoing, the bushing performs better and provides other advantages not found in the prior art but which will be apparent to those to whom the invention is directed.

Having thus described my invention, I am aware that numerous and extensive departures may be made therefrom without departing from the spirit of the invention as defined in the appended claims.

I claim:

1. A drill guide which comprises a cylindrical body having a drill guiding bore, said body and bore being entirely formed from a plurality of superimposed hard discs having uniform exteriors and uniform aligned bores therethrough.

2. A drill guide as described in claim 1 wherein the discs are secured together by soldering, brazing or welding.

3. A drill guide which comprises a base portion formed entirely by superimposing a plurality of aligned apertured hard discs upon each other, at least one of said discs being formed of a material that is harder than the drill to be guided.

4. A drill guide as in claim 3 wherein the harder disc is of material selected from the group consisting of silicon carbide, tungsten carbide and aluminum oxide.

5. A drill bushing which is formed entirely of a plurality of contiguous discs having central apertures which register with one another, at least one of said discs being of a size to form the stem and at least one head disc attached to the stem being larger in diameter than the stem discs.

6. A drill guide bushing comprised entirely of a plurality of contiguous apertured discs superimposed upon each other and forming a hollow drill guiding stem, and means engaging the respective peripheries of said discs to hold them in assembled relation.

7. A device as described in claim 6 wherein said means comprises a thin housing surrounding the respective peripheries of the discs.

8. A drill guide bushing comprising a plurality of contiguous apertured discs superimposed upon each other and forming a hollow drill guiding stem, and means engaging the respective peripheries of said discs to hold them in assembled relation, said housing being of thin sheet metal and deformed at the ends to clamp the discs.

9. A device as described in claim 6 wherein the discs are provided with spaced notches in their respective peripheries and wherein there is provided a housing of sheet metal having longitudinally extending ribs engaged in said notches and ends of soft metal turned over the ends of the outermost discs.

10. A drill guide bushing comprising a stem formed entirely by laminating a plurality of apertured discs, some of said discs being of a relatively soft metal and having sandwiched therebetween in spaced relation from each other discs of hard wear resisting material.

11. A drill bushing comprising a stem for engagement in a jig or the like, said stem having a drill guiding bore, a head for said stem formed to provide a notch at the inner side for passage of a headed index and holding pin, said head being formed with a second notch outward from the first notch and extending laterally from the first notch and peripherally of the head for interlocking engagement with the head of a locking pin, and a locking screw extending through the outer side of said head at said aligned notches and movable into said first notch to block the removal of said locking pin from said second notch.

12. The method of manufacturing drill guide bushings from a plurality of apertured discs which comprises stacking the discs in abutting relation with their apertures registering with one another to provide a drill guide of the desired formation, securing the discs to each other in juxtaposed relation, and finish grinding the interior and exterior of the stacked discs.

13. A device of the class described comprised entirely of a plurality of body sections bonded to each other, said sections being provided with a beveled part at the points where they are bonded to each other to provide a starting point for subsequent severing of the parts from each other.

14. A device as described in claim 13 wherein the sections are of equal length.

15. A device as described in claim 13 wherein the length of the sections may vary.

16. A device as described in claim 13 wherein the sections are formed with a helical peripheral groove.

17. A device of the class described comprised entirely of a plurality of body sections bonded to each other, each of said sections having a cylindrical outer surface of one diameter bounded by surfaces of smaller diameter.

18. A device as described in claim 17 wherein the sections are provided with beveled surfaces at their points of juxtaposition relative to each other.

19. A device of the class described comprised entirely of a plurality of discrete body sections bonded to each other, the exterior of said body sections being cylindrical and each section having a bore comprising a cylindrical mid-portion and formed with flared portions extending from the edge to the cylindrical portion.

20. A device of the class described including a plurality of body sections bonded to each other, each of said sections being formed with an intermediate cylindrical surface of one diameter bounded by cylindrical surfaces of a smaller diameter, the ends of each body section being formed with a peripherally beveled portion, said sections each provided with a bore and the mid-portion of said bore being cylindrical and providing a tool guiding surface, the end portions of said bore being flared outwardly toward the end.

21. A device of the class described including a plurality of body sections bonded to each other, each of said sections being formed with an intermediate cylindrical surface of one diameter bounded by cylindrical surfaces of a smaller diameter, the ends of each body section being formed with a peripherally beveled portion, said beveled portions providing a parting line for subsequent separation of said sections, said sections each provided with a bore and the mid-portion of said bore being cylindrical and providing a tool guiding surface, the end portions of said bore being flared outwardly toward the end.

22. A device of the class described including a plurality of body sections bonded to each other, each of said sections being formed with an intermediate cylindrical surface of one diameter bounded by cylindrical surfaces of a smaller diameter, the ends of each body section being formed with a periphery beveled portion, said beveled portions providing a parting line for subsequent separation of said sections, said sections each provided with a bore and the mid-portion of said bore being cylindrical and providing a tool guiding surface, the end portions of said bore being flared outwardly toward the end, said inner flared portions providing circumferential lubricant holding grooves.

23. A device of the class described including a plurality of body sections bonded to each other, each of said sections being formed with an intermediate cylindrical surface of one diameter bounded by cylindrical surfaces of a smaller diameter, the ends of each body section being formed with a peripherally beveled portion, said beveled portions providing a parting line for subsequent separation of said sections, said sections each provided with a bore and the mid-portion of said bore being cylindrical and providing a tool guiding surface, the end portions of said bore being flared outwardly toward the end, said inner flared portions providing circumferential lubricant holding grooves, and the periphery of said body portions being formed with at least one helical groove.

References Cited in the file of this patent

UNITED STATES PATENTS

| 84,488 | Hart | Dec. 1, 1868 |
| 535,019 | Piper et al. | Mar. 5, 1895 |
| 2,515,383 | Sneva | July 18, 1950 |
| 2,737,425 | Fisher | Mar. 6, 1956 |
| 2,766,083 | Fisher | Oct. 9, 1956 |

OTHER REFERENCES

"Machinery" Magazine, pp. 456–459, Oct. 23, 1947, Design of Bushes for Jigs.